UNITED STATES PATENT OFFICE.

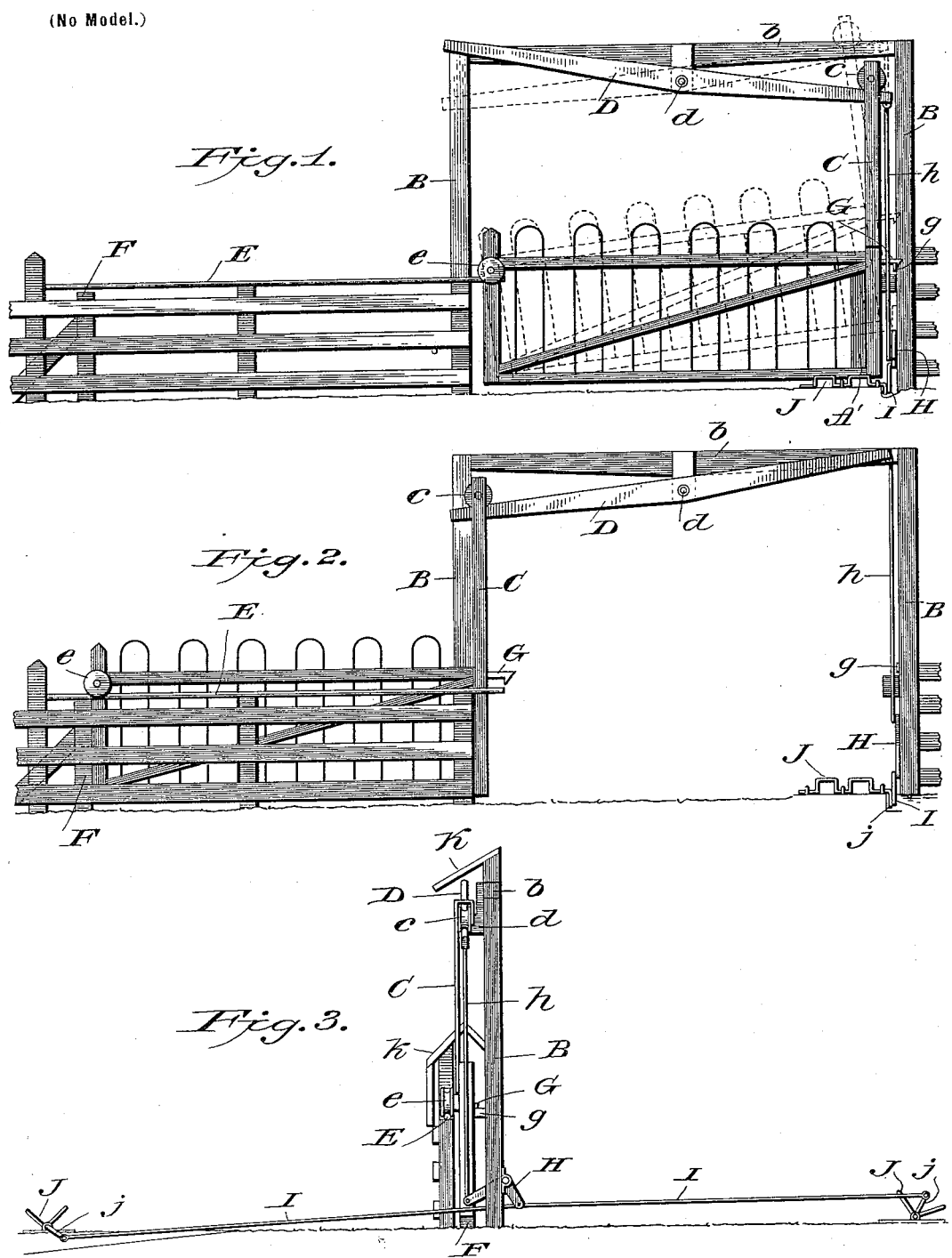

JOHN W. BAKER, OF TIPPECANOE CITY, OHIO.

SLIDING GATE.

SPECIFICATION forming part of Letters Patent No. 658,610, dated September 25, 1900.

Application filed April 24, 1900. Serial No. 14,169. (No model.)

*To all whom it may concern:*

Be it known that I, JOHN W. BAKER, of Tippecanoe City, in the county of Miami and State of Ohio, have invented certain new and useful Improvements in Sliding Gates; and I hereby declare that the following is a full, clear, and exact description thereof, reference being had to the accompanying drawings, which form part of this specification.

This invention is an improvement in sliding farm-gates; and its object is to produce a gate which will be practically self opening and closing and can be operated with great ease, such gates being particularly advantageous for farm use, as they do not necessitate the dismounting of a rider or driver to open and close them.

In the present invention one end of the gate is hung upon an oscillatory track rail or lever and its other end is hung or supported upon a stationary track-rail, and devices are provided whereby the oscillatory track-rail may be tilted so as to cause the gate to open and close wholly by gravity.

The invention therefore consists in the novel construction and combination of parts hereinafter described and claimed.

In the accompanying drawings, Figure 1 is a side view of the complete apparatus with the gate closed. Fig. 2 is a similar view with the gate open. Fig. 3 is a transverse sectional view showing the operating-levers.

Referring to said drawings, the gate A may be of any suitable construction and of a length sufficient to close the space between the two gate-posts B B, which extend considerably above the gate and are connected by a crossbar $b$.

To one end of the gate is attached an upright or hanger C, which extends as high as the bar $b$ and is provided with a grooved roller $c$, which is adapted to run upon the upper edge of an oscillating track-rail D, which is pivoted about midway of its length to the bar $b$, as indicated at $d$. In this manner the forward end of the gate is suspended. The rear end of the gate is suspended by means of a roller $e$, which runs upon a fixed track-rail E, which is suitably supported between adjoining fence-posts. When the track-rail D is inclined to the right, the gate will close and remain closed by gravity; but when it is inclined to the left the gate will be tilted and will by gravity move to the left, the rollers $c$ $e$ running upon the track-rails D E, respectively. In this very simple manner the gate may be operated, and it will be observed that the gate moves the entire distance to open or close by gravity, as the track-rails D and E are equal in length to the desired travel of the gate. The gate may be limited in its opening movement by a stop F and in its closing movement by the right-hand post B or a stop secured thereto. The forward end of the gate is provided with a hook-catch G, which engages a pin or keeper $g$, attached to post B, when the gate closes. In opening the gate this hook will be raised by the gate clear of the pin $g$ before the gate begins to open. The rail D may be operated by any suitable means. As shown, its right-hand end is connected by a rod $h$ to the longer arm of a bell-crank lever H, which is pivoted to the post B, and its shorter arm is connected by a rod I to a crank $j$ on a double-bend carriage trip-lever J, which is constructed, as usual, so as to be rocked by a carriage or vehicle being driven thereover or by a horse stepping thereupon. Two of these trip-levers J are preferably employed, so that the gate may be opened from either side by one trip-lever and closed at the other side by the other trip-lever. Where very wide openings are to be made, two gates may be employed moving in opposite directions, in such case the meeting ends of the gates would be hung upon oppositely-tilting rails D, which might be hinged together at their meeting ends, so that they could both be operated by one system of levers.

In order to protect the track-rails D E from ice and snow, they may be covered by housings K and $k$, as indicated in Fig. 3.

The operation of the gate will be obvious from the foregoing; but it will be noted that it automatically opens and closes according to the inclination of the track-rail D. Preferably the gate is provided with a weight A' at its right-hand or forward end, which will quicken the gravital movement of the gate. It is not necessary to operate the gate automatically in order to allow foot passengers to pass, as they can, by simply raising the catch G, easily open the gate by forcibly sliding it backward and upward on the bar D sufficiently to let them pass, and the gate will then close by gravity.

Having thus described my invention, what I therefore claim as new, and desire to secure by Letters Patent thereon, is—

In a gate, the combination of two upright gate-posts, the horizontal beam connecting the upper ends of said posts, and the horizontally-disposed vibrating track-rail pivoted to said beam at its center, the stationary track-rail located at one side and slightly in advance of the vibrating track-supporting frame; with a gate, having a hanger-bar connected to its front end and extending upwardly a sufficient distance to project slightly above the rear end of the vibrating rail, a roller $c$ attached to the upper end of said hanger, and a similar roller $e$ connected to the rear bar of the gate, said roller $c$ being designed to travel upon the vibrating rod while the roller $e$ travels on the stationary rod; together with a movable upright rod and a bell-crank lever, said rod being connected at one end to said vibrating rail and at its opposite end to one arm of said bell-crank lever, and a long substantially-horizontal arm I connected near its center to the other arm of said bell-crank lever, and two double-bend trip-levers, one attached to each end of the arm I, all constructed and arranged to operate substantially as described.

In testimony that I claim the foregoing as my own I affix my signature in presence of two witnesses.

JOHN W. BAKER.

In presence of—
  E. H. KERR,
  SAML. E. SMITH.